(No Model.) 4 Sheets—Sheet 1.

H. RICHARDSON.
AUTOMATIC WEIGHING MACHINE.

No. 467,021. Patented Jan. 12, 1892.

Witnesses
F. S. Elmore.
W. W. Mortimer

Inventor
Henry Richardson
By his Atty
Phil. T. Dodge (No Model.) 4 Sheets—Sheet 2.
H. RICHARDSON.
AUTOMATIC WEIGHING MACHINE.
No. 467,021. Patented Jan. 12, 1892.
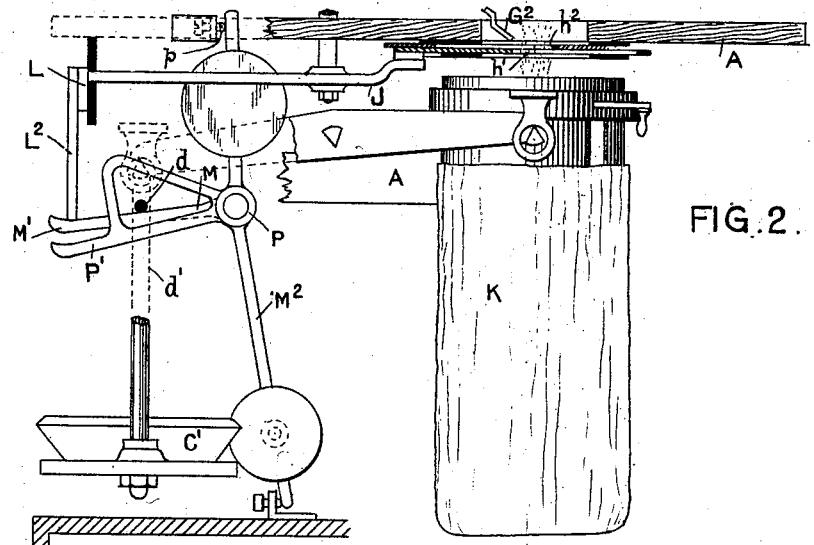
FIG. 2.
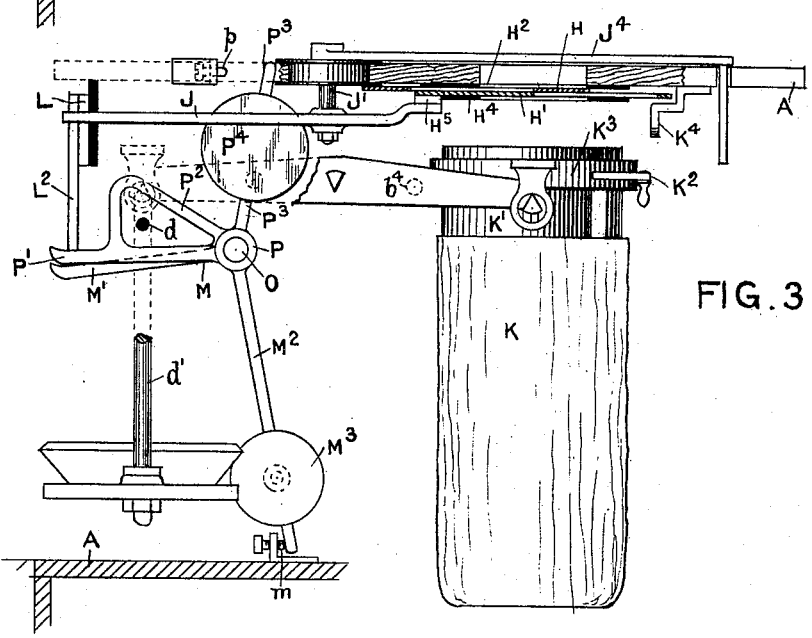
FIG. 3.
FIG. 11.
Witnesses
F. S. Elmore
M. W. Mortimer
Inventor
Henry Richardson
By his Atty
Phil T. Dodge (No Model.) 4 Sheets—Sheet 3.

H. RICHARDSON.
AUTOMATIC WEIGHING MACHINE.

No. 467,021. Patented Jan. 12, 1892.

Witnesses
F. S. Elmore.
M. M. Mortimer

Inventor
Henry Richardson
By his Atty
Phil. T. Dodge

THE NORRIS PETERS CO., PHOTO-LITHO., WASHINGTON, D. C.

(No Model.) 4 Sheets—Sheet 4.

H. RICHARDSON.
AUTOMATIC WEIGHING MACHINE.

No. 467,021. Patented Jan. 12, 1892.

Witnesses
F. T. Elmore
M. N. Mortimer

Inventor
Henry Richardson
By his Atty
Phil T. Dodge

UNITED STATES PATENT OFFICE.

HENRY RICHARDSON, OF LICHFIELD, ENGLAND.

AUTOMATIC WEIGHING-MACHINE.

SPECIFICATION forming part of Letters Patent No. 467,021, dated January 12, 1892.

Application filed April 25, 1891. Serial No. 390,472. (No model.)

*To all whom it may concern:*

Be it known that I, HENRY RICHARDSON, miller, a subject of the Queen of Great Britain, residing at Lichfield, in the county of Stafford, England, have invented certain new and useful Improvements in Automatic Weighing-Machines, of which the following is a specification.

This invention relates to weighing apparatus; and it has for its object the providing of a weighing-machine which shall weigh out into parcels, from a supply-hopper having a feed-orifice, successive regulated quantities of flour or other pulverulent or granular material, especially such material as is liable to arch in the said hopper and can consequently only be fed with difficulty from the hoppers ordinarily employed in weighing-machines of this description, the method at present employed for weighing such material being to fill it into the bags or other receptacles by means of a scoop, the amount being regulated by hand.

Briefly, the invention consists of a feed-hopper provided with a special stirring apparatus, a feed-sluice controlling the discharge of the material from the hopper, a device for holding a bag in position below the feed-orifice, and mechanism connected with the feed-sluice and adapted to be automatically operated or released by the movement of the weigh-beam in such a manner that when the regulated quantity of material has almost been weighed out the feed-sluice is suddenly closed, with the exception of a small orifice, through which the material continues to trickle until the exact quantity has been weighed out, when the sluice is again suddenly operated or released and the supply entirely cut off.

The drawings illustrate one form of apparatus embodying my invention.

Figure 13:
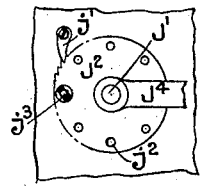
Figure 1:
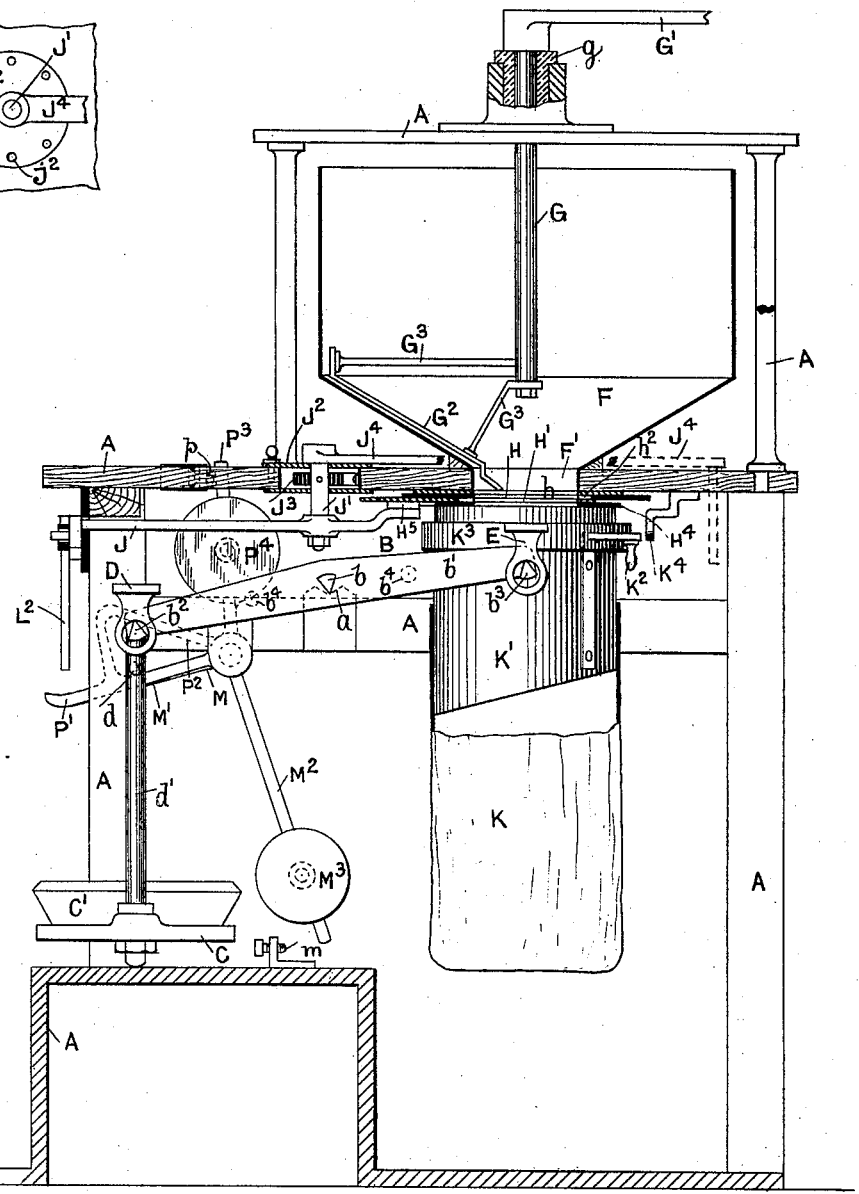
Figure 10:
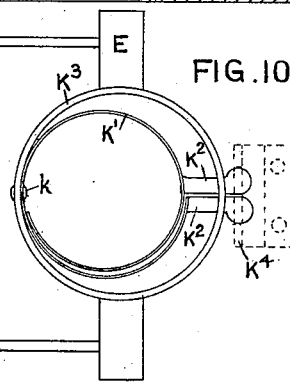
Figure 5:
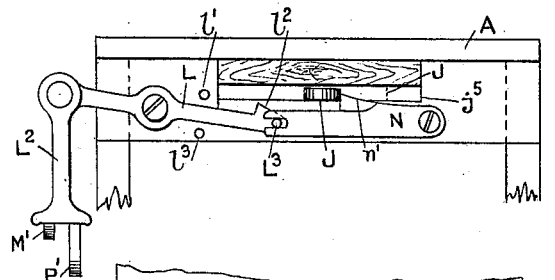
Figure 4:
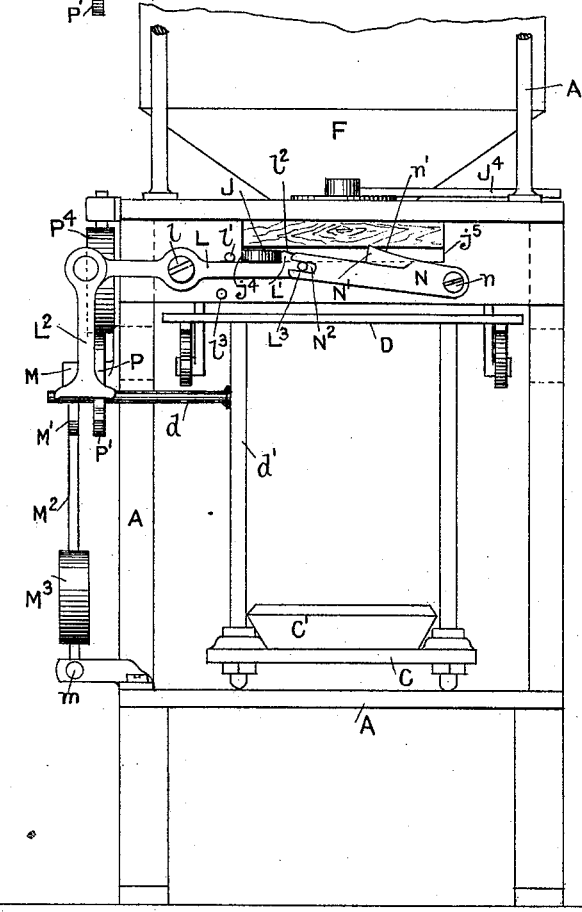
Figure 12:
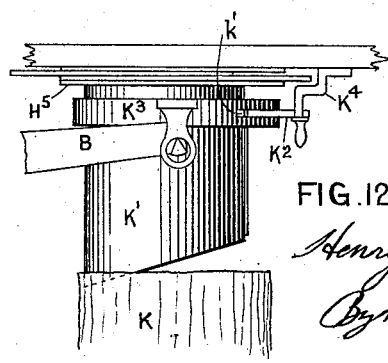
Figure 6:
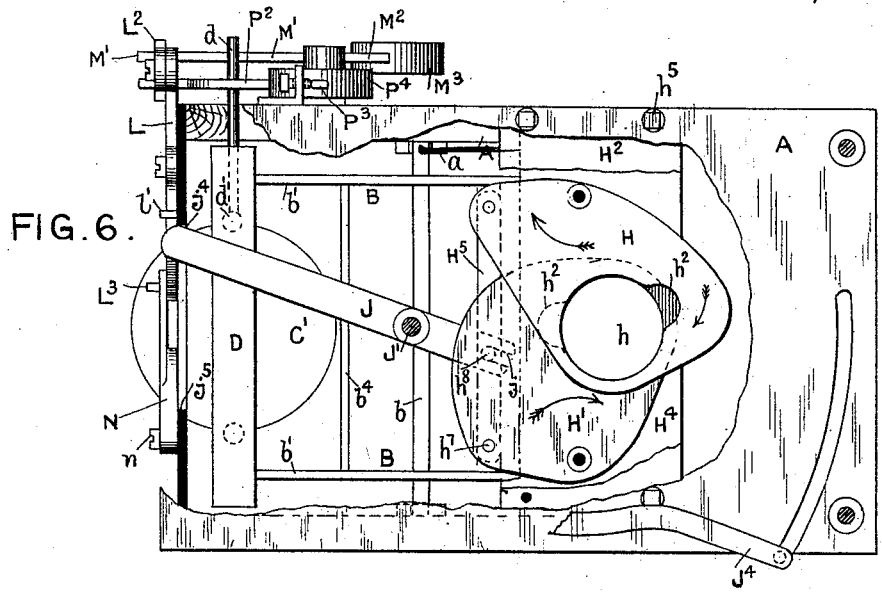
Figure 7:
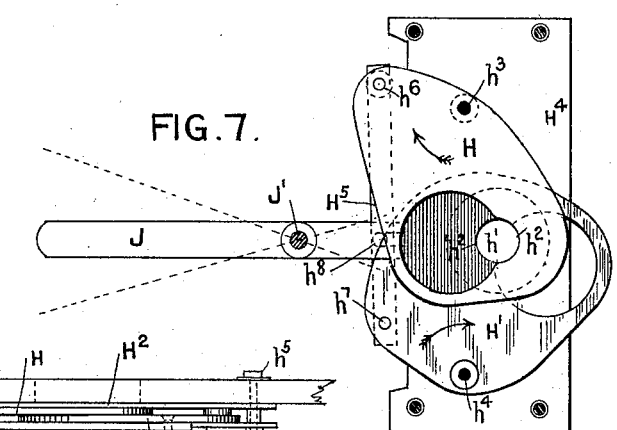
Figure 8:
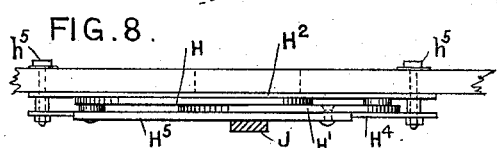
Figure 9:
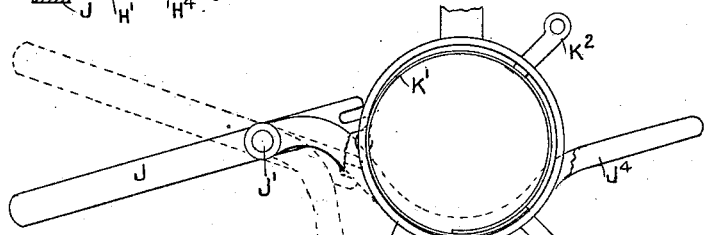

In the drawings, Figure 1 is a side elevation of the machine, showing the position of the parts at the commencement of a weighing operation, the feed-sluice being open and shown in section and the hopper and certain other parts being also in section. Fig. 2 is a side elevation, partly in section, showing the positions occupied by the weigh-beam, sluice, and sluice-operating mechanism after the first or partial cut-off. Fig. 3 is a similar view to Fig. 2, showing the position of the aforesaid parts at the moment of the second or total cut-off. Fig. 4 is an end elevation of the machine, the parts being in the same relative positions as in Fig. 1. Fig. 5 is a view of part of the releasing mechanism shown in Fig. 4 as it appears after the first cut-off, the other parts of the mechanism being as shown in Fig. 2. Fig. 6 is a plan of the feed-sluice fully open and mechanism for operating the same, the frame-work of the machine being broken away for the purpose of showing the parts more clearly. Fig. 7 is a plan of the sluice as it appears after the first cut-off. Fig. 8 is a side view of the feed-sluice, the relative positions of the parts being as shown in Fig. 7. Fig. 9 is a plan of the bag-holding device and sluice-operating lever, the former being in its extended position. Fig. 10 is a plan of the bag-holding device in its contracted position. Fig. 11 is a front elevation of the bag-holding device in its extended position as seen in Fig. 9. Fig. 12 is a side elevation of the same device in its contracted position. Fig. 13 is a plan of the spring adjusting device for the sluice-operating lever.

A is the frame-work of the machine.

B is the weigh-beam, consisting of a central shaft $b$, provided at its ends with knife-edges bearing at $a$ upon the frame-work A, two side levers $b'$, having knife-edges $b^2$ $b^3$ at their ends, and two cross-stays $b^4$.

C is a weight-pan bearing a weight $C'$ and supported upon the knife-edges $b^2$ by a yoke D. The bag or other receptacle which is to receive the material is suspended in any convenient manner by a similar yoke E from the knife-edges $b^3$. The above parts may be of any suitable well-known construction.

F is a conical hopper, or hopper with a conical bottom, supported on the frame-work A and having a short cylindrical feed-orifice F' at its apex.

G is a vertical shaft mounted concentrically to the hopper in a bearing $g$ and provided with a suitable operating device—such as a handle G'—whereby it may be rotated by hand or otherwise. One or more blades or stirrers $G^2$ are attached to the shaft G by an arm or arms $G^3$. Each stirring-blade $G^2$ follows closely the contour of the conical bottom of the hopper and the side of the feed-orifice and extends for any convenient distance upward in proximity to the vertical sides of the hopper where these are employed. The stirrer is also extended downward and inward toward the center of the orifice F' in such a manner that its extreme point touches or almost touches the periphery of the trickling-hole $h'$, hereinafter described, as seen in Fig. 2. Whenever the orifice F' is opened, the material in the hopper tends to "arch" or form a dome over the orifice, thus preventing the free passage of the material through it. The base of this dome may be located close to the periphery of the orifice or at some point between it and the upper edge of the conical bottom. Whatever its exact location may be, however, the rotation of the blade $G^2$ continually removes or loosens the material lying at the base of the dome in close proximity to the conical bottom of the hopper. This effects the continual collapse of the dome, thus preventing the arching of the material in hopper and securing a steady flow of the same through the unobstructed orifice F'. It will be noticed that the blade-operating devices G G' $G^3$ are all mounted above the orifice F', so that there is nothing to prevent the material falling freely in a uniform stream through the said orifice from the continually-undermined dome above it.

By the before-described means I am enabled to feed very coherent material—such as flour or cocoa—through a comparatively small orifice. The hopper-bottom has preferably a small inclination, as shown—say from thirty degrees to forty degrees from the horizontal. If the inclination is much greater than this, the material has a tendency to become compressed toward the axis of the hopper, and this increases the tendency of the material to arch over the discharge-orifice.

H H' are a pair of slides forming a sluice for the feed-orifice F' and working one against the other in opposite directions, as hereinafter described. The slides are provided with similar openings of such a shape that when the sluice is fully opened an unobstructed passage $h$ through both slides, of approximately the same shape and size as the feed-orifice, is presented to the latter, whereas, on the other hand, when the sluice is nearly closed a small trickling-hole $h'$ only is presented, said hole being approximately circular and lying concentric to the feed-orifice. The openings in the slides may for this purpose be conveniently formed of a circular shape, having a small and approximately semi-circular gap $h^2$ on one side, the gaps in the two slides being placed at opposite sides of the hopper-axis. The slides are pivoted at opposite sides of the hopper-axis, as at $h^3$ $h^4$, to the frame-work of the machine or to a plate $H^2$, attached to the frame-work, as by bolts $h^5$, and a lower fixed cover-plate $H^4$ is also, by preference, added. The latter affords additional support to the plates H H' and their pivots, and it is also provided, as is the plate $H^2$, with an opening coincident with the discharge-orifice F'. The plates H H' are connected together by a link $H^5$, working on pivots $h^6$ $h^7$, located on the plates in such manner that a longitudinal movement of the link effects a simultaneous movement of the plates in opposite directions, as seen by the arrows in Fig. 6. The link is adapted to be reciprocated by an oscillating sluice-operating lever J, to which it is connected by a slot $j$ and pin $h^8$. The operating-lever J is fixed upon a short vertical shaft J', which is mounted in bearings formed in the end walls of a spring-box $J^2$, Figs. 1 and 13, carried by the framing A, and is provided with a coiled spring $J^3$, tending to rotate the shaft in the well-known manner in one direction—namely, that necessary for closing the slides H H'. The spring-box $J^2$ is mounted loosely in the frame A, and is held against rotation under the tension of the spring by a pawl $j'$. The upper flange of the box is provided with a series of holes $j^2$, into one of which a bar may be inserted to rotate the box when it is desired to increase the power of the spring. A pin $j^3$ may be passed through one of the holes $j^2$ into the framing to prevent any possible movement of the spring-box during the return stroke of the lever J. The swinging of the lever in one direction or the other thus causes the slides H H' to be moved in opposite directions one over the other and the discharge-orifice F' to be closed or opened.

$J^4$ is a lever secured to the shaft J' and extending to the front end of the machine, whereby the sluice may be opened by the operator, as hereinafter set forth. It will be obvious that instead of operating the lever J on its forward stroke by a spring it could be actuated in the well-known manner by a weight suspended from a cord attached to the side of the lever and passing over a guide-pulley.

K is the bag into which a regulated quantity of the material in the hopper is to be weighed.

K', Figs. 1, 9, 10, 11, and 12, is a spring band or ring adapted to be inserted into the mouth of the bag and capable either of expanding by its own elasticity in order to hold said mouth expanded or of being forcibly contracted by pressing together a pair of handles $K^2$, secured to the band at suitable points thereon. The ends of the band overlap, as seen in Figs. 9, 10, and 11, and slide one over the other when the band is forcibly contracted. The spring-band may be conveniently attached at or about its center, as by a rivet $k$, to an annular frame $K^3$, attached to or forming part of the weigh-beam yoke E. The frame $K^3$ is provided with a peripheral slot $k'$, Figs. 11 and 12, through which the handles $K^2$ $K^2$ project and by which they are guided.

$K^4$ is a catch-piece, which may be conveniently mounted upon the frame-work A, and serves to retain the handles $K^2$ $K^2$ in their closed position, as seen in Figs. 10 and 12, when the yoke E is in its uppermost position, as hereinafter described. The ends of the catch-piece slope away, as at $k^2$, Fig. 11, to facilitate the entrance of the handles into the recess $k^3$ of the catch.

At the commencement of the weighing operation the sluice-operating lever J is held against the action of its spring $J^3$ by a movable stop or trigger L in such position that the feed-sluice is fully open, as in Figs. 1, 4, and 6, so that when the stirring apparatus G $G^2$ $G^3$ above it is operated the material runs freely into the bag K or other receptacle, which has been suspended to the end of the weigh-beam below the orifice F'. When the regulated amount has almost been weighed out, the weigh-beam B has moved into such a position as to cause the movable stop or trigger L to be withdrawn from the lever, as hereinafter described. The latter at once makes a partial revolution about its axis (see Figs. 2, 5, and 7) and closes the feed-sluice, with the exception of the trickling-orifice $h'$, its movement being, however, at this point arrested by a second movable trigger or stop N, which holds it immovable until, the bag having received the exact quantity required, the weigh-beam operates, as hereinafter described, to release the said second trigger, and the lever, being moved still farther under the action of its spring, totally closes the feed-sluice, as seen in Fig. 3.

The triggers L and N and the mechanisms for transmitting the movement of the weigh-beam to them at the proper moments may be arranged in various ways. The following, however, is a convenient arrangement and will serve to illustrate the nature of the invention: The triggers are pivoted to the frame-work of the machine at $l$ and $n$, respectively, the one being provided with a nose L' and the other with a nose N', adapted, respectively, to retain the operating-lever J in its first and second positions, as aforesaid.

$L^2$ is a stem depending from the trigger L on the side of its axis remote from its nose L'.

$l'$ is a stop-pin for preventing the nose-arm of the trigger from moving upward beyond its normal position when otherwise free to do so.

$L^3$ is a pin projecting laterally from the nose end of the trigger L and engaging with a slot $N^2$ in a forward extension of the trigger N, so that the two noses L' and N' move up and down simultaneously, the nose N' being, however, located at a higher level than the nose L', as shown.

$j^4 j^5$ are two fixed stops serving to limit the travel of the lever J.

M and P are two weighted bell-crank levers mounted upon a common axis O in such manner that they may turn independently of each other. The lever M has a lateral arm M', which extends below the trigger-stem $L^2$, and a depending arm $M^2$, which is provided with an adjustable weight $M^3$ and lies normally at a suitable angle from the vertical, as hereinafter described. The lateral arm M' rests during a portion of the weigh-beam's travel against the under side of a pin $d$, projecting from one of the suspension-rods $d'$ of the weight-pan or from some part moving therewith, as seen in Figs. 1, 2, 4, and 6. $m$ is an adjustable stop by which the movement of the lever M is arrested at the proper point. The second lever P has a lateral arm P', extending below the stem $L^2$ and pin $d$ aforesaid, a second lateral arm $P^2$, extending above said pin, and an upwardly-projecting arm $P^3$, provided with an adjustable balance-weight $P^4$. The weighted arm $P^3$ rests normally against an adjustable stop $p$ and is so counterpoised that a very slight movement of the arm about its axis away from the stop will cause the entire lever to be overbalanced. The arms P' and $P^2$ are by preference joined at their outer ends, as shown, in order to strengthen them.

The mode of operation is as follows: The hand-lever $J^4$ and the lever J being in the positions shown in full lines, Figs. 3 and 9, the sluice is closed, as seen in Fig. 3. The bag-holding device, being elevated by the weights on the scale-pan, rests with its upper edge against the cover-plate $H^4$, as in Figs. 1, 11, and 12, the positions of the weigh-beam B, weighted levers M and P, and triggers L and N being as shown in Figs. 1 and 4. The spring-band K' is now compressed by drawing together the handles $K^2 K^2$, and the latter are retained in their closed position by the catch $K^4$, as shown in Fig. 12 and in dotted lines in Fig. 10, thus leaving both hands of the operator free for adjusting the bag K upon the spring-band. This adjustment being effected, the bag end of the weigh-beam is depressed slightly, so that the handles $K^2 K^2$ are released from their catch, and the band K', expanding by its own elasticity, holds the bag securely suspended with its mouth extended. The weigh-beam is now allowed to fall back and bring the upper edge of the band K' once more into contact with the cover-plate $H^4$. At the same time the lever-handle $J^4$ is pushed over into the position shown in dotted lines in the bottom of Fig. 9, causing the sluice to be fully opened, as in Figs. 1 and 6, and the operating-lever J assumes the position shown in Figs. 4 and 6, its further movement being prevented by the stop $j^4$ and its return movement being prevented by its engagement with the nose L' of the trigger L. In order to take up this position, the lever J has in its movement successively depressed the triggers by striking the inclined parts $l^2 n'$, Figs. 4 and 5, thereon, the triggers assuming their normal positions after the passage of the lever by reason of the weight of the stem $L^2$. The sluice being fully opened, the rotation of the stirring-blade $G^2$ causes the material to flow rapidly in a uniform stream into the bag K and the weight end of the weigh-beam rises. As the latter moves upward the arm M' of the lever M, which is held in contact with the pin $d$ by the power of its weighted arm $M^2$, also rises, and as the scale-beam approaches its horizontal position the said arm $M'$ comes in contact with and lifts the stem $L^2$ to such a distance that the nose of the trigger L is depressed, as seen in Fig. 5, and releases the sluice-operating lever J, which moves, under the influence of its spring, to effect the first cut-off. The various parts are so proportioned and adjusted that the lever is released the moment the bag has received the regulated quantity of material less a small amount reserved for the trickle, as before described. After the first cut-off the lever J and slides H H' are in the positions shown in Figs. 2, 5, and 7, the edge of the lever resting against the nose of the trigger N, which, as will be seen from Fig. 5, projects for some distance above the level of the nose of trigger L. As soon as the release of the first trigger has been effected the weighted lever M is arrested in its movement by the stop $m$, and exerts no further influence in the weighing operation. The trickle continues to pass into the bag under the action of the revolving stirrer until the exact regulated amount has been weighed out and the beam has assumed a horizontal or nearly horizontal position. The pin $d$ has meanwhile risen to the under side of the arm $P^2$ of the lever P and has exerted a slight pressure sufficient to overbalance it, the pin $d$ and the lever-arm $P^2$ parting company just at the moment the beam is reaching its horizontal position. In its fall the lever-arm $P'$ strikes the stem $L^2$ a smart blow, which instantly acts, through the medium of the trigger L, a pin $L^3$, and slot $N^2$, to depress the trigger N and suddenly release the sluice-operating lever J to effect the second or total cut-off, the movement of the lever being immediately after arrested by the stop $j^5$, Figs. 5 and 6. The total disengagement of the arm $P'$ and stem $L^2$ by the complete overbalancing of the lever P is prevented by a stop $l^3$, located below the trigger. It will be noticed that when the beam is in its horizontal position—that is, at the moment the first cut-off occurs—it is entirely disconnected from the sluice-operating mechanism and is perfectly free to oscillate upon its knife-edges. To remove the filled bag, the handles $K^2 K^2$ are closed to contract the spring-band $K'$. On the removal of the bag the bag end of the weigh-beam rises and restores the levers M and P to their normal positions by the contact of the pin $d$ with their arms $M'$ and $P'$, respectively, as seen in Fig. 1. This completes one entire operation. It will be observed that the lever M, during the upward movement of its arm $M'$, exerts an upward pressure upon the pin $d$, the said pressure varying according to the position of the weight on the arm $M^2$. By adjusting the weight $M^3$ the operator is enabled to regulate to a nicety the exact point, as measured by the weight of material already in the bag, at which the first cut-off shall take place. In other words, he is able, within certain limits, to shorten or lengthen at will the time during which the trickle shall continue. It will also be seen that the aforesaid upward pressure exerted by the lever-arm $M'$ decreases as the depending arm $M^2$ approaches the vertical position, the pressure being reduced to zero, or nearly so, at the moment the arm reaches its stop $m$ and the pin $d$ parts company with the arm $M'$. The steady movement of the scale-beam is thus not interfered with by a sudden removal of the upward pressure on the pin $d$, as would have been the case had the weight been placed on the arm $M'$ and its more or less vertical movement suddenly arrested by a stop. It will also be noticed that during the first rush of material into the bag when the sluice is opened the upper edge of the spring-band $K'$ rests against the cover-plate $H^4$. There is thus little liability of the material being blown about during the weighing operation, as most of the dust would be raised during the first rush of the material from the hopper.

It is to be understood that during the actual weighing operation, especially when weighing coherent material, such as flour or cocoa, the stirrer should be continuously rotated, this rotation being especially needed to cause the material to run through the small trickling-hole $h'$.

The points of contact between the levers, pin, stem, and stops aforesaid may be rendered adjustable in any well-known manner, as by forming them on the extremities of several set-pins, so that the entire machine may be adjusted as desired.

I declare that what I claim is—

1. In a weighing-machine of the class described, a feed-hopper having a conical bottom with an open unobstructed discharge-orifice at the apex, a rotary shaft or carrier located above and terminating at a point remote from the orifice, and a blade attached to said shaft and extending downward along the bottom of the hopper to a point at or near the periphery of the discharge-opening, whereby the material at the base of the mass is continually loosened and caused to flow through the orifice left wholly unobstructed to prevent the choking or lodging of material therein.

2. In a weighing-machine of the kind described, the combination, with a hopper F, having feed-orifice $F'$, of a double slide H H', adapted to control the discharge of material from said orifice and having similar openings, as described, and slide-actuating mechanism adapted to move said slides one over the other at predetermined points in the weigh-beam's travel, substantially as described.

3. In a weighing-machine of the kind described, the combination, with a hopper F, having a feed-orifice $F'$, of a sluice controlling said orifice and having a large opening of approximately the size of the orifice and a smaller trickling-opening, as described, sluice-operating mechanism adapted to close said openings in succession, and a revoluble stirrer G² in the hopper, having its lower end following closely the contour of said trickling-opening, substantially as described.

4. The combination of the hopper F, the stirrer G², the slides H H' below the hopper-exit and having circular openings $h$ of approximately the same shape as said exit, and a semicircular gap $h^2$ in each of said openings, the gaps being on opposite sides of the hopper-axis, and mechanism for moving the slides one over the other, substantially as described.

5. In a weighing-machine of the kind described, the combination of the swiveling slides H H', adapted to control the feed-hopper exit, the pivoted link H⁵, connecting said slides, as described, the oscillatory lever adapted to reciprocate said link, and mechanism operated by the movement of the weigh-beam and adapted to move said lever about its axis in one direction to the required extent at predetermined points in the weigh-beam's travel, substantially as described.

6. In a weighing-machine of the kind described, the combination of the swiveling slides H H', the pivoted link H⁵, the power-driven slide-operating lever J, and mechanism adapted to release and arrest said lever at predetermined points in the weigh-beam's travel, substantially as described.

7. In a weighing-machine of the kind described, the combination, with the feed-sluice and a spring-driven operating-lever therefor, of a trigger holding said lever against the movement of its operating-spring, and a device movable with the weigh-beam and adapted to disconnect the said trigger and lever at a predetermined point in the weigh-beam's travel, substantially as described.

8. In a weighing-machine of the kind described, the combination of the swiveling slides H H', the pivoted link H⁵, the power-driven slide-operating lever J, triggers successively engaging said lever, and mechanism operated by the movement of the weigh-beam and adapted to release said triggers successively at predetermined points in the weigh-beam's travel, substantially as described.

9. In a weighing-machine of the kind described, the combination, with a feed-sluice and a power-driven operating-lever therefor, of a counterbalanced trigger L, having a nose L' engaging said lever, and a device movable with the weigh-beam and adapted to disengage said trigger and lever as soon as the receptacle on the weigh-beam has received the bulk of the material to be weighed into it, substantially as and for the purpose described.

10. In a weighing-machine of the kind described, the combination, with the spring-driven sluice-operating lever J, of the counterbalanced trigger L, having nose L' engaging said lever, and the counterweighted lever M, having a lateral arm resting during a certain part of the weigh-beam's travel against a pin movable with the weigh-beam and extending in proximity to and adapted to come into contact with a projecting piece on the trigger L, whereby the trigger L and lever J are disengaged and the sluice almost closed as soon as the receptacle on the weigh-beam has received the bulk of the material to be weighed into it, substantially as described.

11. The combination, with the spring-driven sluice-operating lever J, of the counterbalanced trigger L, having nose L' engaging said lever, and the lever M, having a lateral arm M' engaging during a certain part of the weigh-beam's travel the under side of a pin $d$, movable with the weight end of the weigh-beam and also extending below and adapted to engage a projecting piece on the trigger L and having a second counterweighted depending arm M² exerting a gradually-decreasing upward pressure on said pin $d$, substantially as and for the purposes described.

12. In a weighing-machine of the kind described, a weigh-beam, a feed-sluice, and mechanism adapted to successively effect a partial and total cut-off of said sluice, as described, at predetermined points in the weigh-beam's travel, in combination with a weighted lever having a depending weight-arm with adjustable weight adapted to exert a gradually-decreasing pressure upon the weigh-beam in opposition to that of the weight until the moment before the aforesaid partial cut-off, substantially as and for the purposes described.

13. The combination of the weigh-beam B, the yoke D, the pin $d$ thereon, the lever M, having arm M' engaging said pin, depending arm M², weight M³, adjustable on arm M², and stop $m$, substantially as described.

14. In a weighing-machine of the kind described, the combination, with a feed-sluice and a power-driven operating-lever therefor, of a counterbalanced trigger N, having nose N' engaging said lever, and a device operated by the weigh-beam and adapted to instantly disengage said trigger and lever as soon as the required weight of material has passed into the receptacle on the weigh-beam, substantially as described.

15. In a weighing-machine of the kind described, the combination, with the spring-driven sluice-operating lever J, of the counterbalanced trigger N, having nose N' engaging said lever, the nicely-balanced weighted lever P, having an arm extending in proximity to a piece L², moving with said trigger, and a pin $d$, movable with the weigh-beam and adapted to engage a second arm on said lever P and tip over the latter, whereby the trigger N and lever J are disengaged and the slides are totally closed as soon as the receptacle on the weigh-pan has received the predetermined weight of material, substantially as described.

16. The combination, with the spring-driven sluice-operating lever J, of the counterbalanced trigger N, having nose N', the trigger L, having a pin-and-slot connection L³ N² with the trigger N and having a nose L' on a lower level than the said nose N', mechanism for tilting up the trigger L to effect the first release of the sluice-operating lever, and mechanism adapted to tilt up said trigger still farther to effect the disengagement of the operating-lever and trigger N and consequent second release of the said lever, substantially as described.

17. The combination, with the spring-driven sluice-operating lever J, of the counterbalanced trigger N, having nose N' engaging said lever, the lever P, having a lateral arm P' extending below a piece L, movable with said trigger, and having also a second lateral arm P² projecting at a suitable distance above the first and a weighted arm P³ extending upward from the lever-axis in an approximately-vertical direction, a pin $d$, moving with the weight end of the weigh-beam and projecting between the two arms P' and P², being adapted to engage them alternately as the weigh-beam rises and falls, and a stop adapted to retain the entire lever P normally in a nicely-poised position, substantially as and for the purposes described.

18. In a weighing-machine of the kind described, a feed-sluice, a spring-driven operating-lever therefor, and a device for releasing the said lever and effecting the first cut-off of the sluice as soon as the bulk of the required weight of material has been fed into the receptacle on the weigh-pan, in combination with a counterbalanced trigger N, having nose N' engaging said lever, and a device operated by the weigh-beam and adapted to instantly disengage said trigger and lever and effect the final cut-off as soon as the required weight of material has passed into the receptacle on the weigh-pan, substantially as described.

19. The combination of the hopper F, having feed-orifice F', slides H H', link H⁵, spring-driven lever J, scale-beam B, having pin $d$, triggers L and N, having noses L' and N', successively engaging the lever J, and weighted levers M P, engaged successively by pin $d$ and adapted to operate the triggers L and N, respectively, at the proper points of the weigh-beam's travel, substantially as described.

20. In a weighing-machine of the kind described, the combination, with the feed-sluice H H' and weigh-beam yoke E, of the annular frame K³, carried by the yoke, the spring-band K', attached at a suitable point to the frame K³ and adapted to bear at its upper edge against the under side of the sluice during the first part of the weighing operation, the band-contracting arms K², and the fixed catch device K⁴ for said arms, substantially as described.

In testimony whereof I have signed my name to this specification in the presence of two subscribing witnesses.

HENRY RICHARDSON.

Witnesses:
GEO. C. DYMOND,
JOHN HAYES.